US007085806B1

(12) United States Patent
Shapira

(10) Patent No.: US 7,085,806 B1
(45) Date of Patent: Aug. 1, 2006

(54) METHOD AND APPARATUS FOR RECOMMENDING A MATCH TO ANOTHER

(75) Inventor: Joe Y. Shapira, Beverly Hills, CA (US)

(73) Assignee: Matchnet PLC, Beverly Hills, CA (US)

( * ) Notice: Subject to any disclaimer, the term of this patent is extended or adjusted under 35 U.S.C. 154(b) by 747 days.

(21) Appl. No.: 09/706,279

(22) Filed: Nov. 3, 2000

(51) Int. Cl.
*G06F 15/16* (2006.01)

(52) U.S. Cl. ...................... 709/203; 709/202; 709/217; 705/1; 705/14; 707/3; 707/6; 707/10

(58) Field of Classification Search ................ 709/203, 709/214, 204, 206, 207, 219, 202; 705/1, 705/14, 5, 4, 37–39; 707/1, 3, 4–6, 9, 104.1, 707/10, 102.1
See application file for complete search history.

(56) References Cited

U.S. PATENT DOCUMENTS

| | | | | |
|---|---|---|---|---|
| 5,623,660 | A * | 4/1997 | Josephson | 707/9 |
| 5,884,270 | A * | 3/1999 | Walker et al. | 705/1 |
| 5,884,272 | A * | 3/1999 | Walker et al. | 705/1 |
| 5,950,200 | A * | 9/1999 | Sudai et al. | 707/9 |
| 5,963,951 | A * | 10/1999 | Collins | 707/102 |
| 6,061,681 | A * | 5/2000 | Collins | 707/5 |
| 6,385,620 | B1 * | 5/2002 | Kurzius et al. | 707/104.1 |
| 6,571,279 | B1 * | 5/2003 | Herz et al. | 709/217 |
| 6,658,400 | B1 * | 12/2003 | Perell et al. | 707/1 |
| 6,665,389 | B1 * | 12/2003 | Haste, III | 379/196 |

(Continued)

OTHER PUBLICATIONS eHarmony-eHarmony background, Company overview [eharmony.com] Website Launched on Aug. 22, 2000.*

(Continued)

*Primary Examiner*—Saleh Najjar
*Assistant Examiner*—ThuHa Nguyen
(74) *Attorney, Agent, or Firm*—O'Melveny & Myers LLP

(57) ABSTRACT

The present invention comprises a method and apparatus for locating and recommending a match to another. The invention provides people with a way to take an active role in matchmaking between a friend, family member or client of theirs and a prospect date from a database of prospect-users. For example, users may be provided with the ability to review a repository of users who have registered with a dating service (referred to as prospect-users) in order to search for a person who may be compatible with a friend or associate of the user performing the search (referred to as a searching-user). If the searching-user locates a prospect-user whom the searching-user thinks may be of interest to the searching-user's friend or associate (referred to as a client-user), the searching-user may recommend that person to the prospect-user. Thus, the invention provides a way to transmit a recommendation message to the prospect-user via a communication conduit such as a computer network. After viewing an associated profile on the client-user, the prospect-user may respond to the recommendation message by sending a response message to the client-user. The client-user may then view a profile on the prospect-user and elect to reply to the prospect-user's response message. If all of the parties involved indicate a willingness to meet, the system provides a way for the parties to contact one another.

8 Claims, 8 Drawing Sheets

U.S. PATENT DOCUMENTS

| | | | | |
|---|---|---|---|---|
| 6,735,568 | B1 * | 5/2004 | Buckwalter et al. | 705/1 |
| 2002/0069080 | A1 * | 6/2002 | Roy et al. | 705/1 |
| 2002/0103792 | A1 * | 8/2002 | Blank et al. | 707/3 |
| 2002/0178163 | A1 * | 11/2002 | Mayer | 707/10 |
| 2002/0194049 | A1 * | 12/2002 | Boyd | 705/9 |
| 2003/0191673 | A1 * | 10/2003 | Cohen | 705/5 |
| 2004/0122810 | A1 * | 6/2004 | Mayer | 707/3 |
| 2004/0205002 | A1 * | 10/2004 | Layton | 705/26 |
| 2004/0249811 | A1 * | 12/2004 | Shostack et al. | 707/5 |

OTHER PUBLICATIONS

Online dating with Matchmaker's personal Ads-Home page; http://www.matchmaker.co.za/s/.*

EHarmony background; http//www.eharmony.com/singles/servlet/press/comapny.* eCRUSH.com—About eCRUSH, {http://www.ecrush.com/aboutus.phtml} (Mar. 2, 2001).

eCRUSH—Frequently Asked Questions, {http://www.ecrush.com/faq.phtml} (Mar. 2, 2001).

* cited by examiner

METHOD AND APPARATUS FOR RECOMMENDING A MATCH TO ANOTHER

FIELD OF THE INVENTION

This invention relates to the field of computer software. More specifically, the invention relates to a method and apparatus for performing matchmaking on behalf of another.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

BACKGROUND

Dating services are known in the art and have existed for a number of years. Such services typically maintain a database of people who have expressed an interest in meeting other people with the view of eventually becoming romantically involved or married. In the past, most dating services operated via mail. However, more recently dating services have begun to utilize computerized mechanisms (e.g., a database) to store information about a variety of individuals. Such systems provide users with a way to search for a person who is compatible with the user's interests.

Some dating services provide users with access to the dating service's database via computer networks such as the Internet. Such network-based services provide user's with a way to locate people that may be compatible with the user's interests and likes and dislikes. In a typical on-line service, users register with the service and provide extensive background information about themselves. The information typically includes contact information and personal information such as the user's occupation, income, educational level, hobbies, interests, religion, children, smoking habits, drinking habits and appearance, including height, weight and race. In addition, these services inquire about the desired characteristics of prospective dates, including age, education, religion, race, politics, desire for children and smoking and drinking habits.

A problem with current network-based systems is that they do not provide an efficient way for users to initiate communication between other parties. For example, such systems lack a mechanism for allowing a 3$^{rd}$ party (the user) to locate a person compatible with a friend or associate and recommend that person to the friend or associate. Therefore, since such systems do not provide a way for 3$^{rd}$ party matchmaking, they do not have means to easily inform the user's friend or associate the user has recommended a possible match. Existing systems allow users to attempt to find a date that is compatible with their own interests, however such systems do not provide a way to locate and recommend a date to another person. Thus, there is a need for a network-based system that allows users to search for and recommend a date to another person.

Additionally, there is a need for a mechanism to keep the recommending party informed about whether the recipient expressed an interest in the recommendation. For example, it is desirable to keep a recommending party apprised of whether the recipient has taken further action based on the recommendation provided. Thus, there is also a need for a system that can track the status of the recommendation provided to another.

SUMMARY OF THE INVENTION

The present invention comprises a method and apparatus that provides a matchmaker (e.g., a searching user) with a mechanism for locating and recommending a prospect-user to a client-user. An embodiment of the invention provides the matchmaker with a way to take an active role in matchmaking between a friend, family member or client of theirs and a prospect date from a database of prospect-users. For example, the invention provides matchmakers (referred to individually as a searching-user) with the ability to review a repository of users who have registered with a dating service (referred to as prospect-users) in order to search for a person who may be compatible with a friend or associate of the user performing the search.

If the searching-user locates a prospect-user who the searching-user thinks may be of interest to the searching-user's friend or associate (referred to as a client-user), the searching-user may initiate a double-blind communication with the prospect-user to introduce the prospect-user to the client-user. Thus, an embodiment of the invention provides a way for the searching-user to locate a prospect-user, transmit a recommendation message to the prospect-user via a communication conduit such as a computer network, and provide the prospect-user and the client-user with an opportunity to contact one another. Each searching-user manage one or more client-users, conduct searches for prospect dates, initiate contact with prospects, and sponsor communication between a prospect and a client.

The recommendation message is part of the double-blind exchange and does not typically disclose the real identity of the searching-user or the client-user. However, the recommendation message does provide a mechanism for the prospect-user to contact the searching-user or the client-user. For example, the recommendation message may provide a mechanism for communicating with a server configured to forward a response from the prospect-user to either the searching-user or the client-user. In one embodiment of the invention, the recommendation message comprises a profile that generally characterizes the client-user. The profile may be a portion of the recommendation message or it may be a link or file associated with the recommendation message. The invention also contemplates the use of a recommendation message that contains profile information about the selected prospect-user embedded into the message. The recommendation message may also comprise a reply button that, if selected, provides a way for the user who receives the recommendation message (e.g., the prospect-user) to send a response to the searching-user and/or the client-user. If the prospect-user, for example, is interested in contacting or learning more about the recommended client-user, the prospect-user may select the link embedded in the recommendation message. Once the link is selected, the system presents a document (e.g., a web page) that comprises more detailed profile information and/or information about how the client-user can initiate communication with the prospect-user. In one embodiment of the invention, selecting the reply button provides an interface that the recipient of the recommendation message (e.g., the prospect-user or the client-user) may enter text and/or any other type of data into. The interface transmits the text and other data associated with the recipient's response through a computer. The server computer is configured to remove all identifying information about the prospect-user and forward the message to the searching-user and/or the client-user. The response message therefore, does not contain any information that would allow the searching-user and/or the client-user to ascertain the real-identity of the prospect-user.

If the response message is transmitted to the client-user, the client-user may select a link embedded in the response message to view profile information about the prospect-user.

If after viewing the profile on the prospect-user, the client-user is interested in meeting the prospect-user the client-user may transmit a reply to the response message that indicates a willingness to meet with the prospect-user. The system may then provide the client-user and the prospect-user with a way to get in touch with one another in order to arrange a time to meet.

DETAILED DESCRIPTION

Figure 1:
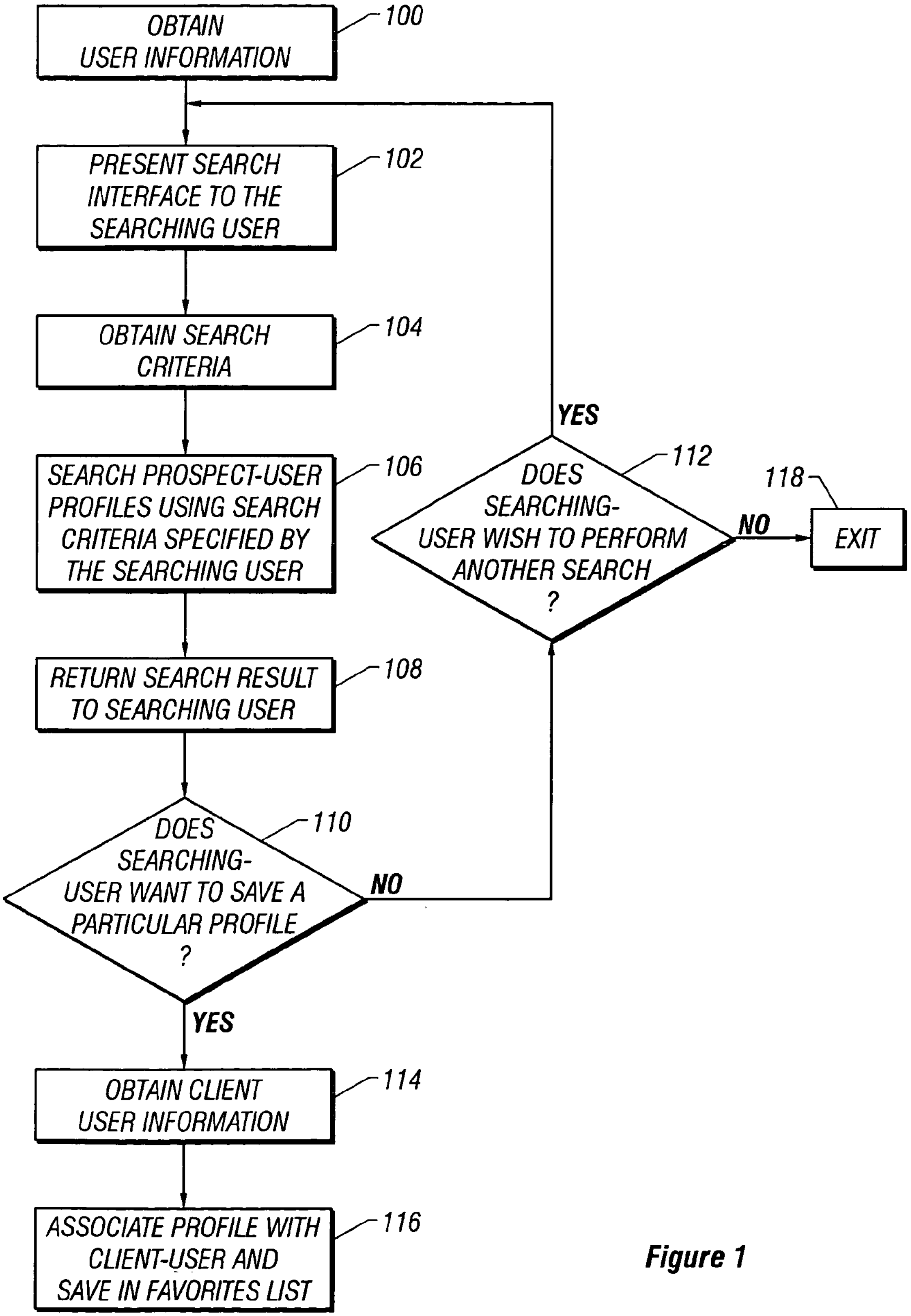
FIG. 1 illustrates the process utilized by an embodiment of the invention to locate and inform a friend of a profiled-user that may be of interest to the friend.

A method and apparatus for recommending a match to another is described. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

The invention may be implemented in hardware and/or software form and may, for example, comprises computer readable program code tangibly embodied in a computer readable medium such as a processor, or memory coupled to the processor. In other instances, the invention executes in memory such as a hard disk, floppy disk, and/or or any other form of memory capable of storing computer readable program code.

System Overview:

The present invention comprises a method and apparatus that provides a matchmaker (e.g., a searching user) with a mechanism for locating and recommending a prospect-user to a client-user. An embodiment of the invention provides the matchmaker with a way to take an active role in matchmaking between a friend, family member or client of theirs and a prospect date from a database of prospect-users. For example, the invention provides matchmakers (referred to individually as a searching-user) with the ability to review a repository of users who have registered with a dating service (referred to as prospect-users) in order to search for a person who may be compatible with a friend or associate of the searching-user. A searching-user is an individual who is known to the system and wishes to fix-up a client-user and a prospect-user. A prospect-user is a person known to the system who wishes to meet another person for the purposes of dating or a relationship. A client-user is a person who is known to the system and known to the searching-user, who wishes to meet another person for the purpose of dating or a relationship. A user is considered known to the system if the system has assigned the user a unique user-ID and password.

An embodiment of the invention, for example, provides a searching-user with a way to locate a possible match for another. If, for example, the searching-user has a friend who enjoys spending time with other people who are interested in a particular hobby, the searching-user may utilize the system described herein to locate people who the friend might be interested in dating. In one or more embodiments of the invention, searching-users can access a repository comprising other user profiles (e.g., prospect-users). The searching-user may then search the repository for people whom the searching-user thinks a particular individual (e.g., the client-user) may be interested in dating. When the searching-user locates people who have a profile that the searching-user thinks may interest the individual who the user is trying to find a match for, the searching-user may save the located profile in a favorites list. A favorites list comprising one or more profiles that are each associated with a particular individual may then be saved and accessed by the searching-user at a later point in time.

If the searching-user locates a person whom the searching-user thinks may be of interest to the friend (e.g., client-user), the searching-user may use an embodiment of the invention to inform the friend of the searching-user's selection. For example, the searching-user may initiate a blind communication with the prospect-user to introduce the prospect-user to the client-user. In a blind communication neither the sender nor the recipient reveals any identifying information (e.g., an email address). The present invention contemplates various types of blind communications. For example, the system may provide the searching-user with a mechanism for sending a blind message to a prospect-user. A blind message comprises a message that can be transmitted to a recipient (e.g., the prospect-user) without the sender (e.g., the searching-user) knowing the email address of the recipient. However, when the recipient receives the message the sender's address (e.g., the searching-user's email address) may be revealed to the recipient. Thus, the recipient may send a response directly to the searching-user without involving the system. This may be referred to in one embodiment of the invention as a direct response. In other instances, the invention contemplates the utilization of a double blind exchange in both directions. For example, if a two-way double blind exchange is utilized all communications are sent through a centralized location (e.g., a server) that comprises the addressing information of both parties, but each party involved in the communication is unaware of the other party's address or identifying information. The system may also provide the searching-user with a way to send a direct response straight to a prospect-user, if the prospect-user opts to disclose the appropriate address information.

If the searching-user locates a prospect-user whom the searching-user thinks may be of interest to the searching-user's friend or associate (e.g., the client-user), the searching-user may recommend the client-user to the prospect-user. Thus, an embodiment of the invention provides a way to transmit a recommendation message to the prospect-user via a communication conduit such as a computer network. For example, the searching-user may send a recommendation message to the prospect-user via the blind-exchange. The recommendation message may take the form of email and/or any other type of mechanism for transmitting a message to a recipient (e.g., voice mail, fax, etc . . . ). The recommendation message comprises an invitation to view details and/or details about the client-user the searching-user wishes to recommend. The recommendation message is typically sent via a blind-exchange and thus the searching-user is unaware of the prospect-user's addressing information. The recommendation message also does not disclose the real identity of the client-user. However, the recommendation message does contain enough information to inform the prospect-user that the searching-user knows of a person (e.g., the client-user) who may be of interest to the prospect-user. For example, in one embodiment of the invention the recommendation message comprises a link to a profile of the client-user. Thus, if the prospect-user wishes to learn more about the client-user, the prospect-user may select the link and thereby view a profile on the client-user. The invention also contemplates the use of a recommendation message that contains profile information about the client-user embedded into the message.

If the prospect-user is interested in contacting or learning more about the recommended client-user, the prospect-user may select a button or link embedded in the recommendation message. Once the button is selected, the system presents a document (e.g., a web page or voice message) that comprises more detailed profile information and/or information about how the prospect-user can initiate communication with the client-user. If the prospect-user wishes to communicate with the client-user, the prospect-user can elect to send a response message to the client-user. For example, the prospect-user may select a command button or link that causes the system to transmit a response message to the client-user via a computer network. In accordance with one embodiment of the invention, the response message utilizes the blind-exchange and does not contain any information that would allow the prospect-user to ascertain the real-identity of the client-user.

When the prospect-user receives the response message the prospect-user may select a link embedded in the response message to view profile information about the client-user. If after viewing the profile on the client-user, the prospect-user is interest in meeting the client-user the prospect-user may transmit a reply to the response message that indicates a willingness to meet with the client-user. The system may then provide the client-user and the prospect-user with a way to get in touch with one another in order to arrange a time to meet. In one embodiment of the invention, the reply sent by the prospect-user is not a blind communication and therefore provides the client-user with an address to contact the prospect-user. The invention also contemplates copying the searching-user on communications between the prospect-user and client-user. Thus, the searching-user is kept apprised of the status of the communications between the two parties.

The Registration Process:

FIG. 1 illustrates the process utilized by an embodiment of the invention to locate and inform a prospect-user of a client-user that may be of interest to the prospect-user. In one embodiment of the invention, the process initiates when the searching-user (e.g., the user wishing to locate a person on behalf of a friend), registers with the system. The searching-user may also elect to register the client-user. Once the searching-user registers with the system, the searching-user may initiate a subscription or buy tokens. Subscription provides the searching-user unrestricted access to privileged features of the system. For example, a subscription may allow the searching-user to contact a prospect-user to introduce a client-user. The searching-user may be required to pay for the subscription with a credit card or other form of payment.

The searching user may also buy tokens. Each token comprises a unit representing payment for contacting other system users. Privileged use deducts a token from the searching-user's allotment of tokens and terminates when the searching-user runs out of tokens. For example, each token may represent an interval of time in which the searching-user may utilize privileged features of the system. Tokens may also represent the number of times which the searching-user may use privileged features of the system. For example, it may cost the searching-user a token to transmit a message to a prospect-user introducing the client-user to the prospect-user.

If the searching-user registers the client-user, the client-user may also be provided with access to the system's privileged features. In order to use privileged features each user is typically required to have a positive token balance. A user that is not registered is still allowed access to the systems free features. For example, the searching-user may be allowed to search the repository of prospect-users. However, the searching-user may not be permitted to communicate with the prospect-users.

The registration process begins at step 100 where the system obtains information about the searching user and/or the client-user (the searching-user may register a client-user with the system). The invention contemplates obtaining various kinds of information from the searching-user. The system may, for example, provide the searching-user with an interface for entering a screen name, a password, and other information associated with the client-user and/or the searching-user. Such information may comprise a user name (e.g., the searching-user), address, phone number, e-mail address, birth date, birthplace, and other profile information. Profile information may comprise any type of information that would help define and/or explain the user's character traits and/or personality. For example, the system may ask the searching-user to provide information such as that illustrated in FIGS. 2*a* and 2*b*.

In one embodiment, registration of the client-user by the searching-user must be approved by the client-user. A searching-user wanting to register an associate as a client-user must first obtain authorization in the form of a password, for example, from the associate. In one or more embodiments, the potential client-user (i.e. associate) must be somebody already known to the system. Without proper authorization, the profiles of a client-user will not be available for viewing and searching by the searching-user or viewing and contacting by the prospect-user. This feature protects unwilling participants from being prank registered as client-users without their knowledge and consent.

Figure 2A:
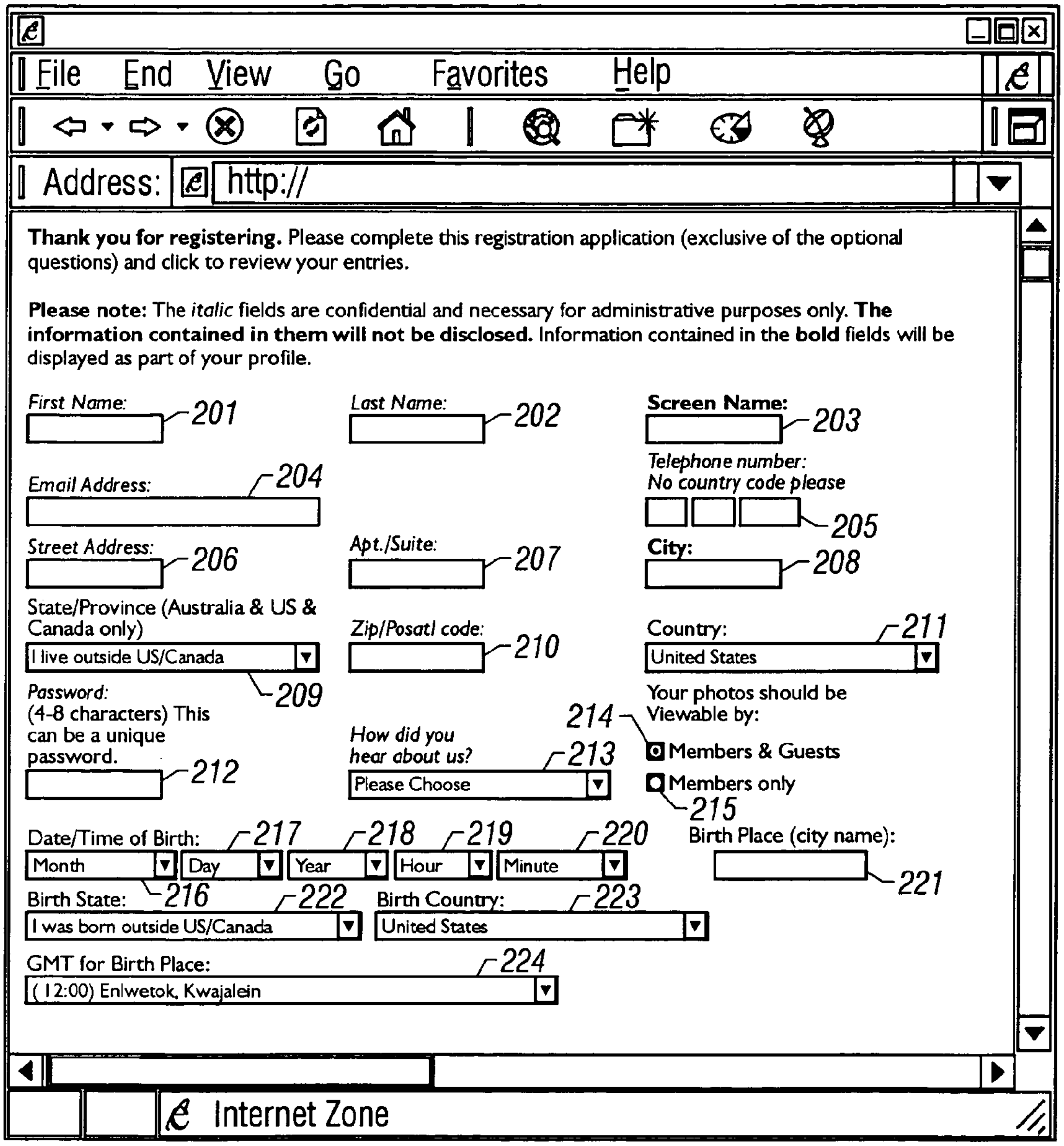
FIGS. 2*a* and 2*b* illustrates an example of the registration interface presented to the user in one embodiment of the invention is shown.
Figure 2B:
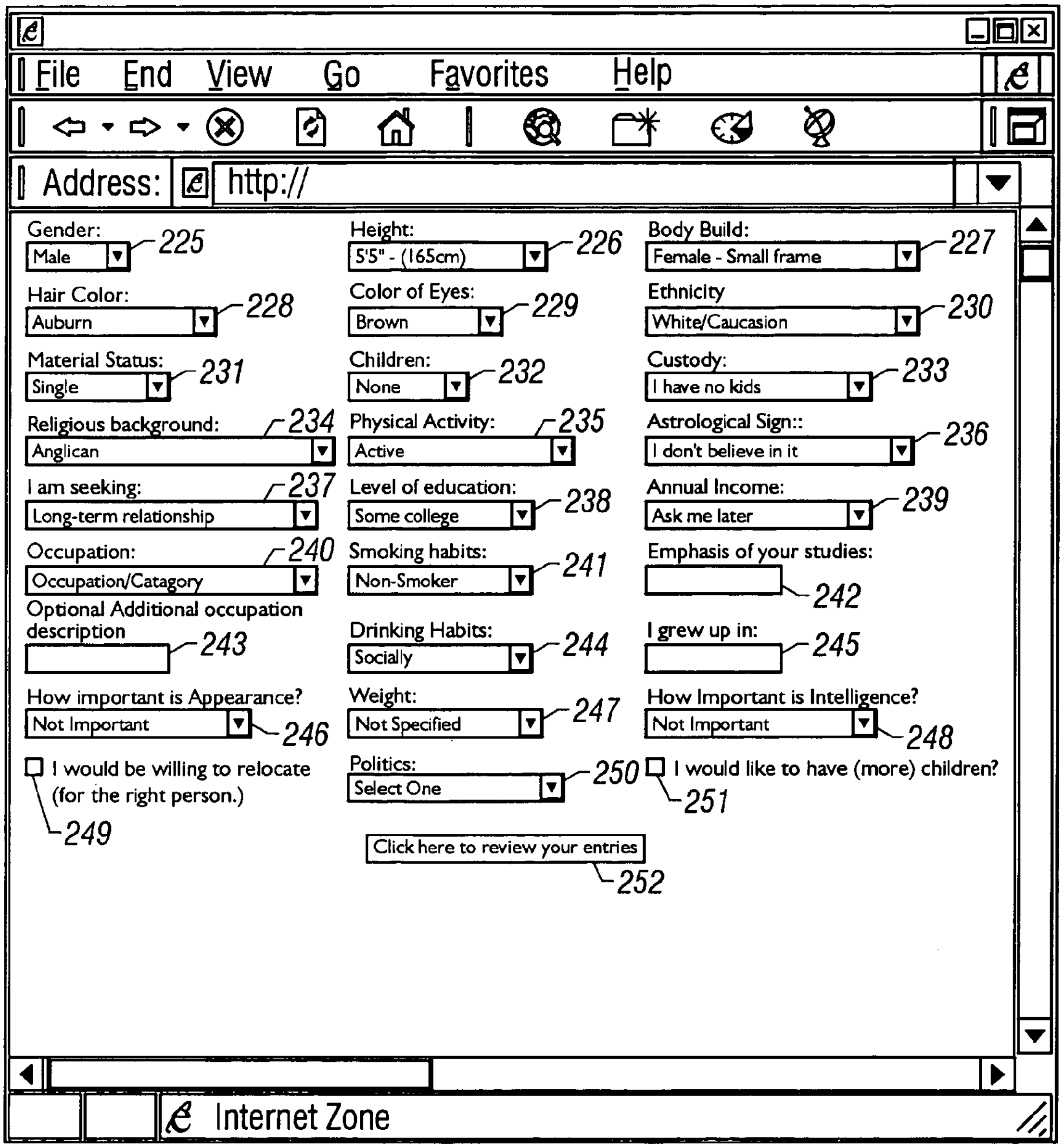

Referring now to FIGS. 2*a* and 2*b* an example of the registration interface presented to the user in one embodiment of the invention is shown. At the top of FIG. 2*a* instructions are provided for data entry during the registration process. Fields identified by italicized titles are confidential and are to be provided by the searching-user for the administrative purposes of the service operator.

Information provided in the fields with bold titles is used to construct the searching-user's profile.

In FIG. 2*a* at 201 the searching-user is provided with an interface for entering the user's first name and, at 202, the last name is entered. The searching-user may use this interface to provide information about the searching-user and/or the client-user (collectively referred to as a user). A provision for selection and entry of a screen name is provided at 203. At 204 the user enters an email address and a telephone number, including an area code, but without a country code, is entered at 205. The user's street address is entered at 206 and any apartment or suite number is entered at 207. At 208, the user enters the user's city and, at 209, a state or province for residents of the United States, Canada and Australia only. A zip or postal code is entered at 210 and a country at 211. At 212, a password containing from four to eight characters is selected and entered. At 213, users are asked to provide information about how they learned about the service. The user indicates whether any photos provided should be viewable by members and guests at 214 or members only at 215, by clicking on alternative boxes. Of the above items, the first name, last name, Email address, telephone number, street number, apartment or suite number, state or province, zip or postal code, password and the answer to the question about how the user heard about the site are confidential and necessary for administrative purposes. The remaining information will be displayed as part of the user's profile.

In the next section of FIG. 2*a* and FIG. 2*b* the user enters the month of birth at 216, the day of birth at 217, the year of birth at 218, the hour of birth at 219 and the minute of birth at 220. The user's city or place of birth is entered at 221, together with the birth state at 222, the birth country at 223 and the GMT (Greenwich Mean Time) for the birthplace at 224.

In the last section of FIG. 2*b*, users enter information on their gender at 225, height at 226, body build at 227, hair color at 228, color of eyes at 229 and ethnicity at 230. Marital status is entered at 231, number of children at 232 and child custody arrangements at 233. Users enter information about their religion at 234, whether physically active at 235 and their astrological sign at 236. At 237, users enter information on what they are seeking (for example, a long term relationship). The user's level of education is entered at 238, annual income at 239, occupation at 240, smoking habits at 241, emphasis of studies at 242 and optional additional occupation description at 243. Users enter information on drinking habits at 244 and where they grew up at 245.

The remaining questions in FIG. 2*b* concern the user's date preferences, such as appearance at 246, weight at 247 and intelligence at 248. At 249, the user is asked to indicate if they are willing to relocate for the right person. A question about politics is tasked at 250 and, at 251, the user is asked to indicate whether they want to have children. Finally, when all of the information is complete, users click at 252 to review and enter their entries, if the entries are acceptable, otherwise, the user may modify the entries as necessary before accepting.

The registration interface shown in FIGS. 2*a* and 2*b* is for example purposes only. The reader should note that in one or more embodiments of the invention the searching-user is not require to provide all of the aforementioned information. For example, the system may only require the searching-user to provide enough information to uniquely distinguish the one user from another (e.g., a unique username and/or password).

The Search Process:

Referring back to FIG. 1, once the system obtains information from the searching-user, the searching-user is allowed to access a search interface. At step 102 the system presents a search interface to the searching user. The search interface comprises one or more fields for defining the type of prospect-user the searching-user is trying to locate on behalf of a client-user (e.g., the friend). In one embodiment of the invention, for example, the search interface provides fields for entering characteristics the searching user thinks the client-user might be interested in.

Figure 3:
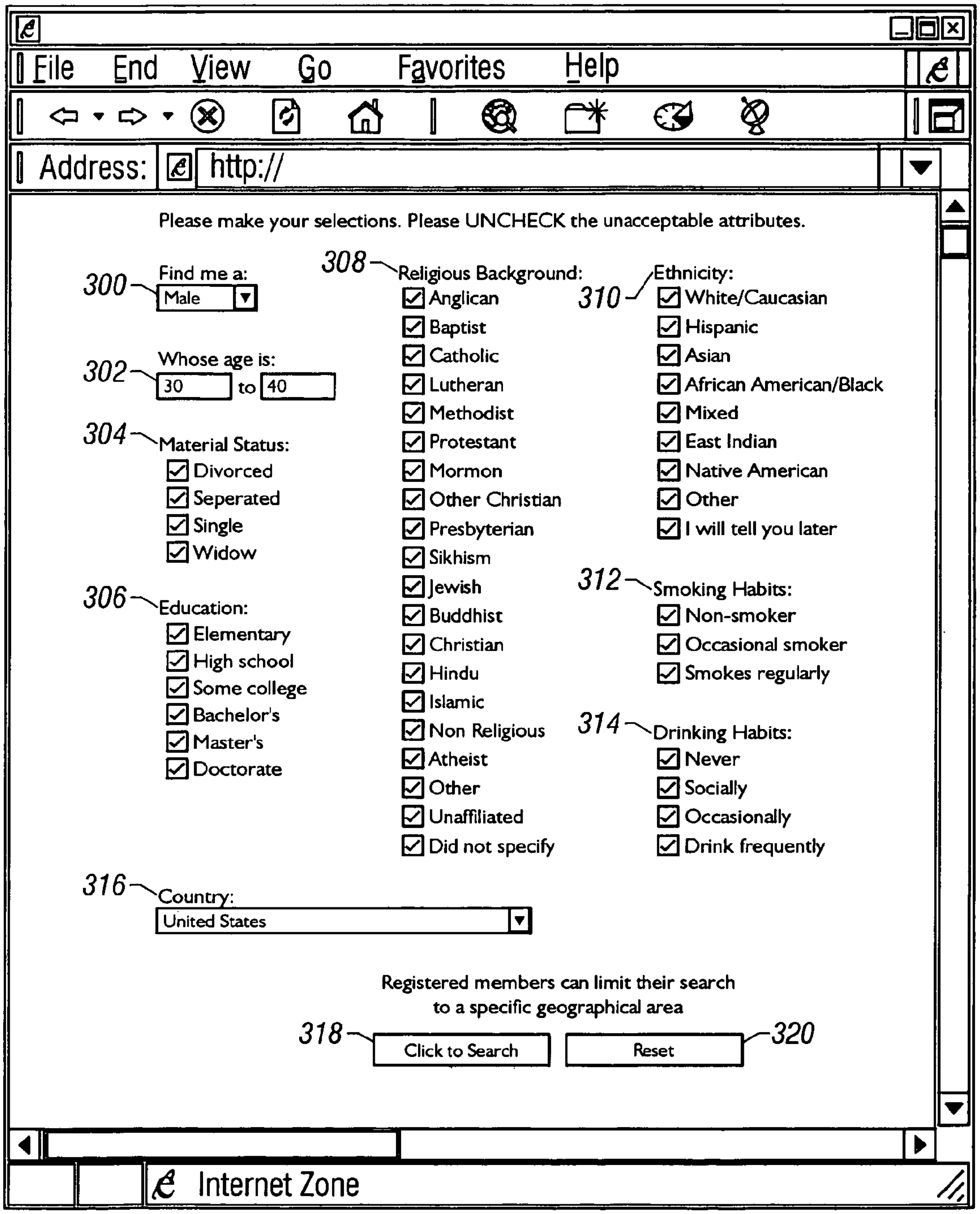
FIG. 3 illustrates the search interface that is presented to the searching user in one embodiment of the invention.

FIG. 3 illustrates the search interface that is presented to the searching-user in one embodiment of the invention. The search interface may, for example, provide the searching-user with fields for entering the following type of information on the desired attributes of the user's preferences. In FIG. 3, at 300, the searching-user may indicate whether they are interested in finding a male or female within the age range specified at 302. For the remaining attributes, the searching-user specifies the desired preferences by unchecking or otherwise marking boxes next to unacceptable or acceptable attributes. For example, at 304, four boxes are displayed with check marks next to four marital status possibilities: divorced, separated, single, and widowed. If the searching-user decides that one of these categories is unacceptable, they remove the check next to the unacceptable attribute by clicking on the box next to the attribute. In other embodiments, however, the searching-user may be asked to select or otherwise identify the characteristics of the prospect-user the searching-user is attempting to locate. At 306, education attributes are listed and at 308 a number of religious backgrounds are listed for the user to select. Ethnicity selections are listed at 310, smoking habits are listed at 312 and drinking habits are listed at 314. At 316, the user enters the country from which the selection is to be made. A search is initiated by clicking on the button at 318 or the search may be reset by clicking on the button at 320.

The reader should note, however, that the invention contemplates a search interface with more fields, less fields and/or different fields. The search interface may comprise any type of information that would aid the system in locating a prospect-user potentially compatible with the client-user. The searching user can therefore use the searching interface to define the criteria utilized to search through the various profiles stored on the system. Once the system obtains the search criteria from the user via the search interface (e.g., at step 104), the search can be executed. At step 106 of FIG. 1, for example, the system uses the search criteria to search a plurality of prospect-user profiles. Each prospect-user profile comprises information specified by an individual when that particular individual registered with the system. The system compares the search criteria against the profiles to determine which profiles are associated with prospect-users that are likely to be of interest to the client-user and/or the searching user who is acting on behalf of the client-user. In one embodiment of the invention, the search obtains the profiles that contain the largest percentage of relevant words. However, the invention contemplates the use of other search mechanisms and may, for example, also use statistical ranking schemes or any other scheme capable of using the search criteria specified by the searching user to obtain a set of one or more prospect-user that are likely to be of interest to the person associated with the information in the corresponding search. Once the search is performed, the system returns the results of the search to the searching-user (e.g., step 108). The system may, for example, present the searching-user with profiles that contain information about the prospect-users who may be of interest.

Figure 4:
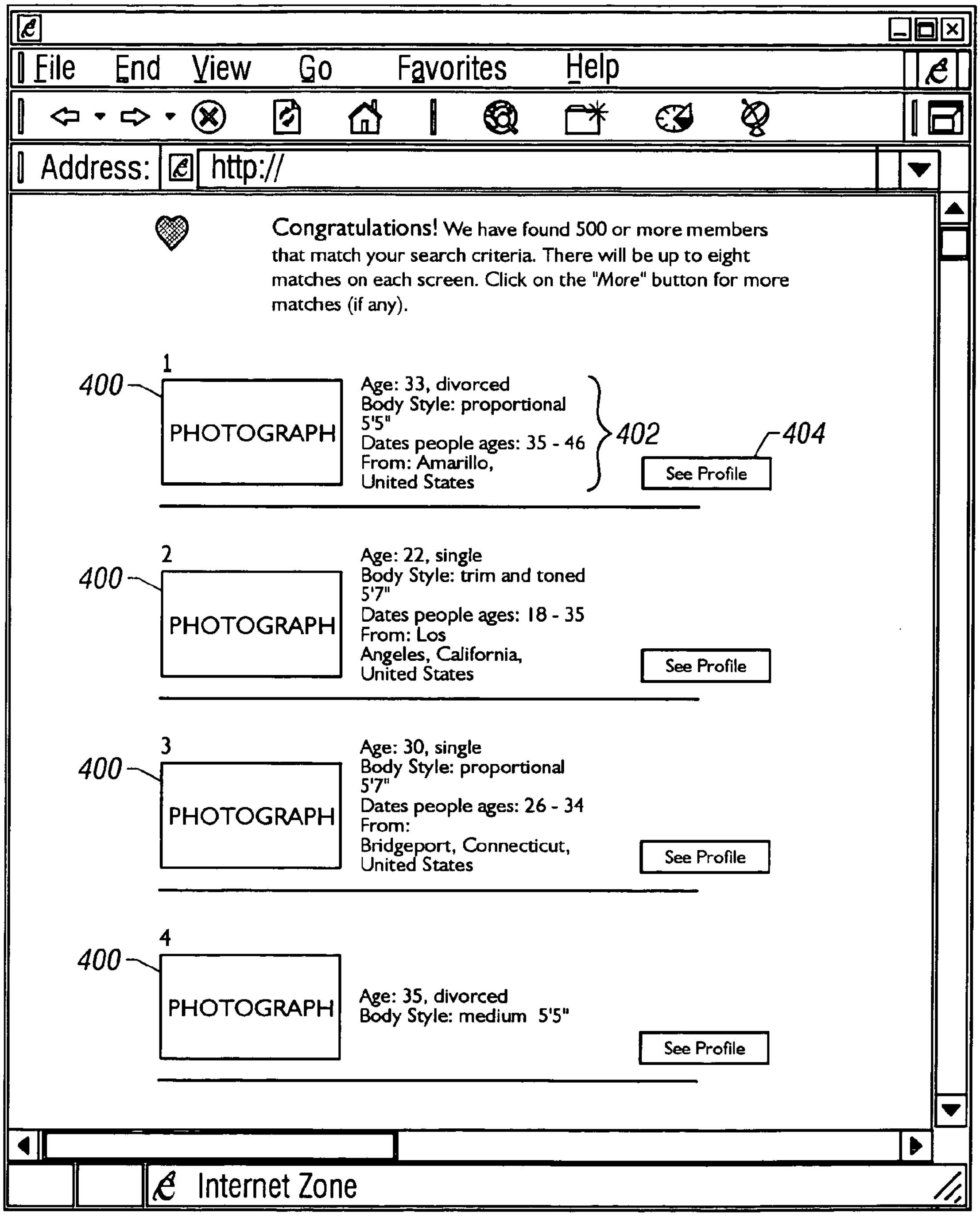
FIG. 4 provides an example illustration of the type of results that may be obtained by an embodiment of the invention when the searching user performs a search.

Search Results:

FIG. 4 provides an example illustration of the type of results that may be obtained by an embodiment of the invention when the searching-user performs a search of the member database. The system may, for example, display an image of the prospect-user and provide information associated with that particular prospect-user. For instance, in the screen illustrated in FIG. 4, the number of matches located during the search is displayed at the top of the screen with instructions for obtaining more information on each individual. At 400 a photograph is displayed of a prospect-user located during the search (the actual photograph may not be shown to protect the person's privacy). At 402, the age, marital status, body style, height, age preferences and city and country of residence are shown for the prospect-user selected by the computer. The button 404 displays an autobiographical essay prepared by the prospect-user when the searching-user clicks on the button. The invention contemplates the presentation of any type of information about one or more prospect-users. For example, the results page may contain more or less information than that illustrated in FIG. 4.

Selection of a Recommendation:

Once the system provides the results of the search, the searching-user may review the results and determine whether any of the profiles contained in the search are of interest (e.g., step 110). The system provides the searching-user with a mechanism for performing another search, exiting the system, and/or saving one of the profiles of interest. If the searching-user wishes to save a particular profile of interest, the system provides a mechanism to save the profile and to associate that profile with a possible recipient (e.g., a particular client-user). For example, the system may obtain information about a possible recipient from the searching-user (e.g., at step 114). The information about the recipient is saved in a recipient/client-user profile. In one embodiment of the invention, the recipient profile comprises a summary of information about the recipient.

However, in order to save client-user profile information, the system may only require the searching-user to provide a name to associate with the client-user profile. The invention also contemplates providing the searching user with a way to associate prospect-user profile information with a plurality of potential recipients. For example, once the system obtains information about one or more client-users (e.g., at step 114), the system may associate a particular profile of a prospect-user with an identified client-user and save the association in a favorites list which the searching-user may access at a later point in time.

If, for example, the searching-user does not wish to perform another search (e.g., step 112) because none of the displayed profiles are of interest), step 113 may execute and allow the searching-user to exit the system. If, on the other hand, the searching-user wishes to perform another search, step 102 may re-execute and thereby present the search interface to the searching-user for another search.

Figure 5A:
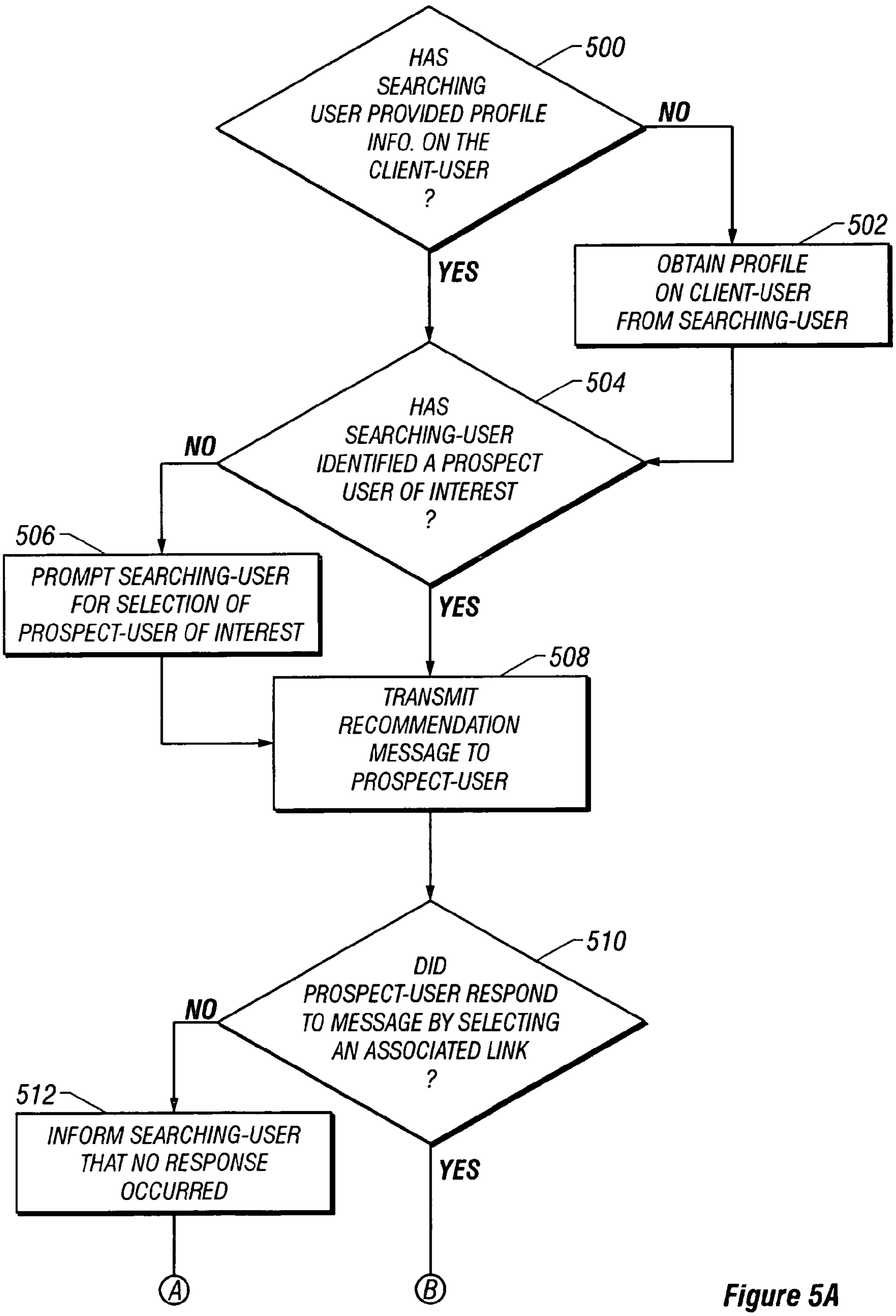
FIGS. 5*a* and 5*b* illustrates the process utilized by an embodiment of the invention to recommend a user-prospect profile to a client user.
Figure 5B:
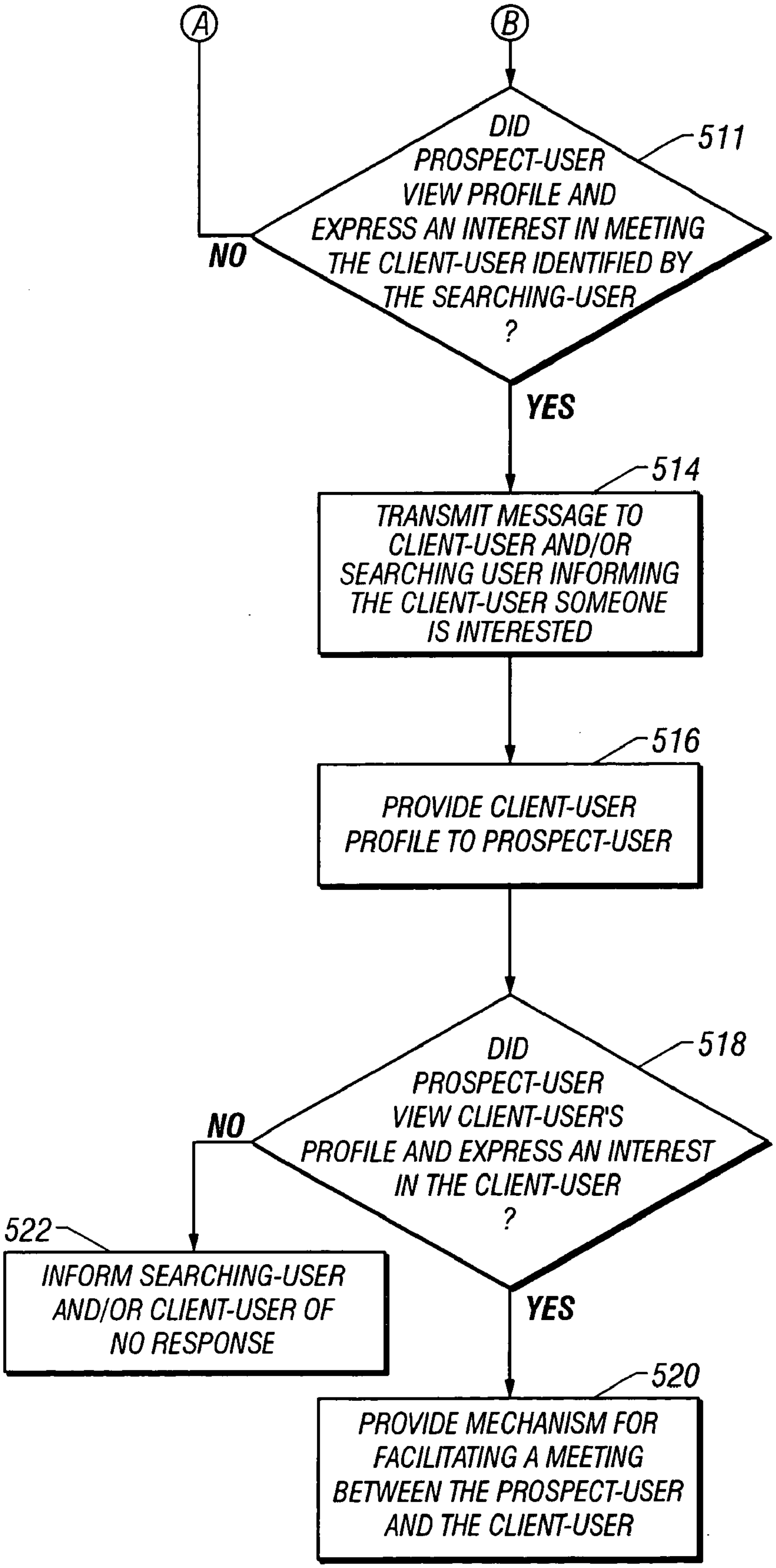

Initiating a Blind-Exchange:

Once the searching-user has identified a prospect-user that may be of interest to the client-user the searching-user has in mind, the searching-user may use the system to forward information about the client-user to the prospect-user. FIGS. 5*a* and 5*b* illustrates the process utilized by an embodiment of the invention to recommend a client-user profile to a prospect-user.

The process initiates at step 500 when the system determines if the searching user has already provided profile information associated with the client-user. If the searching user has not provided such profile information, step 502 executes and the system obtains profile information about the client-user from the searching user. The system may, for example, display a registration interface such as the one illustrated in FIGS. 2*a* and 2*b* or it may provide a profile interface that comprises fields for entering information about the client-user. The profile interface enables the searching-user to provide information the searching-user knows about the client-user. The searching-user may, for example, use the profile interface to summarize the client-user's various character traits and personality traits. Once the system obtains a profile on the client-user, the system determines if the searching-user has identified a prospect-user that may interest the client-user. For instance, the system may determine if the searching-user has indicated that a certain prospect-user is the person who the searching-user wishes to attempt to match with the client-user. If the searching-user has not yet identified a particular prospect-user, the system executes step 506 where it asks the searching-user to identify a prospect-user that may be of interest to the client-user.

Once the prospect-user is identified, the searching-user may transmit a recommendation message to the prospect-user via a communication interconnect. The invention contemplates the use of various types of communication interconnects. For example, embodiments of the invention may transmit data from one point to another point via any type of interconnection fabric that provides a mechanism for transmitting and/or client data. In one or more embodiments of the invention, data is sent across an interconnection fabric that comprises any of multiple suitable communication paths for carrying data between multiple computational devices. The interconnect fabric may be, for example, a local area network, a wide area network, a virtual private network, the Internet, an Intranet, a wireless network, or any other type of interconnect capable of sending data from one device to another. The interconnect fabric may be implemented with a physical medium such as a wire or fiber optic cable, or it may be implemented in a wireless environment using microwave signals, light signals, or any other type of wireless communication mechanism.

In one embodiment of the invention, the recommendation message is transmitted via e-mail. However, the invention contemplates utilizing other mechanisms for providing the recommendation message to the prospect-user. The message may, for example, come in the form of video data, voice data, textual data, image data, and/or any other form of data communication capable of presenting the recommendation message to the prospect-user. The recommendation message informs the prospect-user that the searching-user has identified a client-user that may possibly be of interest to the prospect-user. In one embodiment of the invention, if the prospect-user does not wish to receive communications from the searching-user, the prospect-user may block future communications from the searching-user.

The recommendation message may comprise a brief description of the client-user. For example, the recommendation message may also contain information that summarizes and/or characterizes the client-user in such a way that it provides the prospect-user with enough information to determine whether the prospect-user should make further efforts to contact the client-user. The recommendation message may also provide the prospect-user information about the client-user's likes and dislikes, personal history, and/or any other information deemed to be of relevance. In one or more embodiments of the invention, the recommendation message may also contain embedded data such as images and/or other graphic files. The recommendation message may state that a more detailed description of the client-user (e.g., a profile) can be viewed at a particular web page or by calling a particular telephone number.

In one embodiment of the invention, the recommendation message comprises a pointer to a more detailed profile on the client-user. The message may, for example, contain a URL that points to a particular web server that is capable of obtaining the client-user profile information from a data repository and presenting that profile information to the user in visual and/or audio form. When the user selects the pointer (e.g., by clicking the URL), the system presents the prospect-user with the profile information associated with the client-user. The system may, for example, transmit a web page to the prospect-user that comprises such profile information. In accordance with one embodiment of the invention, the personal information associated with the client-user (e.g., the client-user's real name, address, phone number, etc . . . ) is excluded from the profile. Personal information about the client-user is not shared with the prospect-user or with any of the other user's unless the client-user authorizes the disclosure of such information.

If the prospect-user is interested in meeting the client-user, the prospect-user may elect to respond to the recommendation message. The response may be sent to the searching-user and/or to the client-user via a blind exchange. For example, the prospect-user may respond to the recommendation message by selecting the link to the client-user's profile (e.g. at step 510) and providing an indication the prospect-user is interested in contacting the client-user (e.g., step 511). At step 514, a response message is transmitted to the client-user and/or the searching-user informing the client-user that someone (e.g., the prospect-user) has expressed an interest in meeting the client-user.

The response message may provide a pointer (e.g., a URL, link, or other type of button) to a profile that characterizes the prospect-user. Thus, the client-user may traverse the pointer to obtain profile information on the prospect-user.

The response message does not typically disclose any personal information about the prospect-user, but instead provides general information that is intended to help the client-user decide whether to attempt to arrange a meeting with the prospect-user. Personal information such as the prospect-user's identity is excluded from the response message and not contained in the profile associated with the prospect-user. Therefore, the prospect-user's personal information and the client-user's personal information both remain confidential. However, the client-user may view the prospect-user's profile (e.g. at step 516) by selecting a link to the prospect-user's profile and use the information in the profile to help determine whether to respond. If the client-user elects to respond to the response message (e.g. at step 518), the system executes step 520 where it provides a mechanism for facilitating further communication between the client-user and the prospect-user. If the client-user does not express an interest in the prospect-user, the system may notify the searching-user and/or the prospect-user that the client-user has viewed the prospect-user's profile, but has elected not to respond.

Embodiment of Computer Execution Environment (Hardware)

Figure 6:
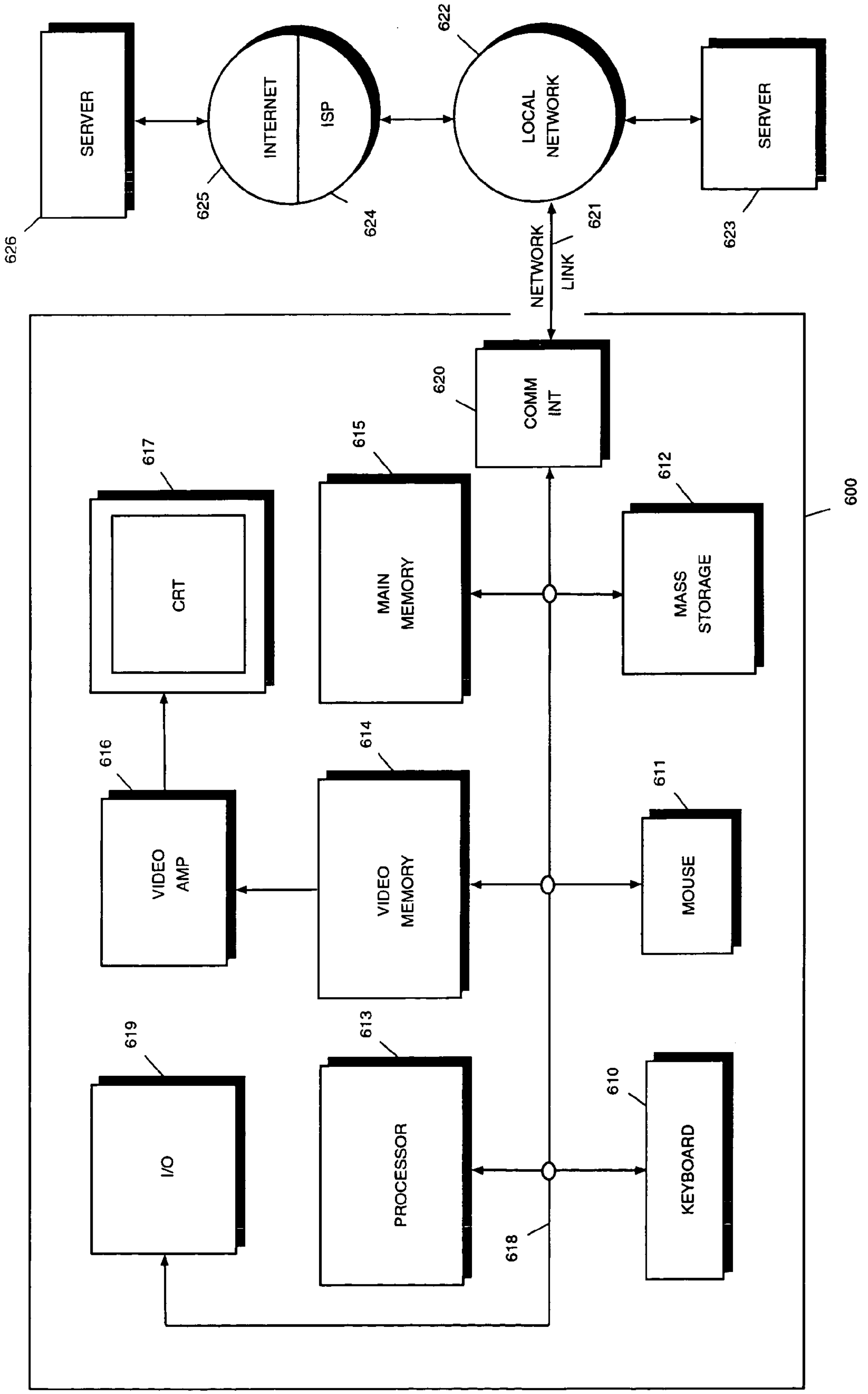
FIG. 6 illustrates a general hardware environment that may be utilized to implement an embodiment of the invention.

An embodiment of the invention can be implemented as computer software in the form of computer readable program code executed on one or more general-purpose computers such as the computer 600 illustrated in FIG. 6. A keyboard 610 and mouse 611 are coupled to a bi-directional system bus 618 (e.g., PCI, ISA or other similar architecture). The keyboard and mouse are for introducing user input to the computer system and communicating that user input to central processing unit (CPU) 613. Other suitable input devices may be used in addition to, or in place of, the mouse 611 and keyboard 610. I/O (input/output) unit 619 coupled to bi-directional system bus 618 represents possible output devices such as a printer or an A/V (audio/video) device.

Computer 600 includes video memory 614, main memory 615, mass storage 612, and communication interface 620. All these devices are coupled to a bi-directional system bus 618 along with keyboard 610, mouse 611 and CPU 613. The mass storage 612 may include both fixed and removable media, such as magnetic, optical or magnetic optical storage systems or any other available mass storage technology. The system bus 618 provides a means for addressing video memory 614 or main memory 615. The system bus 618 also provides a mechanism for the CPU to transferring data between and among the components, such as main memory 615, video memory 614 and mass storage 612.

In one embodiment of the invention, the CPU 613 is a microprocessor manufactured by Motorola, such as the 680X0 processor, an Intel Pentium III processor, or an UltraSparc processor from Sun Microsystems. However, any other suitable processor or computer may be utilized. Video memory 614 is a dual ported video random access memory. One port of the video memory 614 is coupled to video accelerator 616. The video accelerator device 616 is used to drive a CRT (cathode ray tube), and LCD (Liquid Crystal Display), or TFT (Thin-Film Transistor) monitor 617. The video accelerator 616 is well known in the art and may be implemented by any suitable apparatus. This circuitry converts pixel data stored in video memory 614 to a signal suitable for use by monitor 617. The monitor 617 is a type of monitor suitable for displaying graphic images.

The computer 600 may also include a communication interface 620 coupled to the system bus 618. The communication interface 620 provides a two-way data communication coupling via a network link 621 to a network 622. For example, if the communication interface 620 is a modem, the communication interface 620 provides a data communication connection to a corresponding type of telephone line, which comprises part of a network link 621. If the communication interface 620 is a Network Interface Card (NIC), communication interface 620 provides a data communication connection via a network link 621 to a compatible network. Physical network links can include Ethernet, wireless, fiber optic, and cable television type links. In any such implementation, communication interface 620 sends and receives electrical, electromagnetic or optical signals which carry digital data streams representing various types of information. The network link 621 typically provides data communication through one or more networks to other data devices. For example, network link 621 may provide a connection through local network 622 to a host computer 623 or to data equipment operated by an Internet Service Provider (ISP) 624. ISP 624 in turn provides data communication services through the world wide packet data 110 communication network now commonly referred to as the "Internet" 625. Local network 622 and Internet 625 both use electrical, electromagnetic or optical signals that carry digital data streams to files. The signals through the various networks and the signals on network link 621 and through communication interface 620, which carry the digital data to and from computer 600, are exemplary forms of carrier waves for transporting the digital information.

The computer 600 can send messages and receive data, including program code, through the network(s), network link 621, and communication interface 620. In the Internet example, server 626 might transmit a requested code for an application program through Internet 625, ISP 624, local network 622 and communication interface 620.

The computer systems described above are for purposes of example only. An embodiment of the invention may be implemented in any type of computer system or programming or processing environment. When a general-purpose computer system such as the one described executes the process and process flows described herein, it is configured to provide a mechanism for recommending a match to another is described.

Thus, a method and apparatus for recommending a match to another is described. Particular embodiments described herein are illustrative only and should not limit the present invention thereby. The claims and their full scope of equivalents define the invention.

What is claimed is:

1. A computer program product comprising:

a computer readable medium having computer readable program code for locating a match embodied therein, said computer readable program code configured to:

obtain a first profile associated with a client-user from a searching-user;

present a plurality of second profiles associated with a plurality of prospect-users to said searching-user wherein said searching-user reviews said plurality of second profiles on behalf of said client-user;

obtain a selection associated with at least one of said plurality of prospect-users from said searching-user, wherein said selection identifies a selected prospect-user;

transmit a recommendation message comprising information from said first profile to said selected prospect-user through an intermediary, wherein said intermediary removes identifying information associated with said searching-user from said recommendation message before forwarding said recommendation message to said selected prospect-user;

obtain a response message from said at least one said selected prospect-user, wherein the response message comprises at least one of said plurality of second profiles associated with said selected prospect-user; and transmit said response message to said client-user via the intermediary, wherein said intermediary removes identifying information associated with said prospect-user.

2. The computer program product of claim 1 wherein said selection associated with said at least one of said plurality of prospect-users is stored in a favorites list.

3. The computer program product of claim 1 wherein said recommendation message comprises said first profile associated with said client-user.

4. The computer program product of claim 1 wherein said recommendation message comprises a link associated with said first profile.

5. The computer program product of claim 1 wherein said computer readable program code configured to transmit said recommendation message to said selected prospect-user routes said message through an intermediary.

6. The computer program product of claim 1 wherein said intermediary comprises a blind exchange.

7. The computer program product of claim 1 wherein said computer readable program code transmits said response message to said searching-user.

8. The computer program product of claim 1 further comprising computer readable program code configured to:

present said response message to said client-user.

* * * * *